United States Patent
Tang

(10) Patent No.: US 8,510,765 B2
(45) Date of Patent: Aug. 13, 2013

(54) OPTICAL DISC FIXING DEVICE AND OPTICAL DISC DRIVE USING SAME

(75) Inventor: Zi-Ming Tang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 372 days.

(21) Appl. No.: 12/901,663

(22) Filed: Oct. 11, 2010

(65) Prior Publication Data

US 2011/0185376 A1    Jul. 28, 2011

(30) Foreign Application Priority Data

Jan. 27, 2010  (CN) .......................... 2010 1 0300800

(51) Int. Cl.
*G11B 17/03*    (2006.01)
(52) U.S. Cl.
USPC ....................................................... 720/604
(58) Field of Classification Search
USPC ....................................................... 720/604
See application file for complete search history.

(56) References Cited

U.S. PATENT DOCUMENTS

| 7,581,235 B2 * | 8/2009 | Oota ............................. 720/707 |
| 2006/0048176 A1 * | 3/2006 | Choi et al. .................... 720/707 |
| 2007/0192779 A1 * | 8/2007 | Oota ............................. 720/707 |
| 2007/0192780 A1 * | 8/2007 | Oota ............................. 720/707 |
| 2007/0200465 A1 * | 8/2007 | Shiga ........................... 310/67 R |
| 2008/0178204 A1 * | 7/2008 | Kuramoto et al. ............ 720/604 |
| 2008/0282272 A1 * | 11/2008 | Smirnov ....................... 720/604 |
| 2009/0119690 A1 * | 5/2009 | Smirnov et al. .............. 720/604 |
| 2009/0241140 A1 * | 9/2009 | Takaki et al. ................. 720/604 |

FOREIGN PATENT DOCUMENTS

CN    101510432 A    8/2009

* cited by examiner

*Primary Examiner* — David D Davis
(74) *Attorney, Agent, or Firm* — Altis Law Group, Inc.

(57) ABSTRACT

An optical disc fixing device and an optical disc drive using the optical disc fixing device are provided. The optical disc fixing device is configured for fixing an optical disc thereto. The optical disc defines a circular mounting hole at the center portion. The optical disc fixing device includes a cylindrical clamping chassis, at least one latching piece, at least one elastic member, and a control member. The clamping chassis is substantially the same shape as the mounting hole of the optical disc and has a peripheral sidewall. The at least one latching piece together with the at least one elastic member are assembled within the clamping chassis. The control member is releasably assembled to the clamping chassis for extending the at least one latching piece from the peripheral sidewall of the clamping chassis to hold the optical disc.

15 Claims, 6 Drawing Sheets

OPTICAL DISC FIXING DEVICE AND OPTICAL DISC DRIVE USING SAME

BACKGROUND

1. Technical Field

The disclosure relates to device fixing and, particularly, to an optical disc fixing device used in an optical disc drive of an electronic device.

2. Description of Related Art

Optical disc drives have been widely used in audio and video equipment for reading and/or reproducing audio, video, documents, and the like, in a variety of media, such as CD (Compact Disc), DVD (Digital Versatile Disc), etc. Optical disc drives generally include optical disc fixing devices for mounting optical discs thereon and preventing the optical discs from disengaging from the optical disc drives when rotating at high speeds.

However, the existing optical disc fixing device often has a complex structure with numerous components, is difficult to assemble, and inconvenient to repair. Moreover, it can be difficult to fix an optical disc thereto and detach the optical disc therefrom.

Therefore, there is room for improvement within the art.

BRIEF DESCRIPTION OF THE DRAWINGS

Many aspects of the disclosure can be better understood with reference to the following drawings. These drawings are not necessarily drawn to scale, the emphasis instead being placed upon clearly illustrating the principles of the optical disc fixing device and optical disc drive using same. Moreover, in the drawings like reference numerals designate corresponding sections throughout the several views.

DETAILED DESCRIPTION

Figure 1:
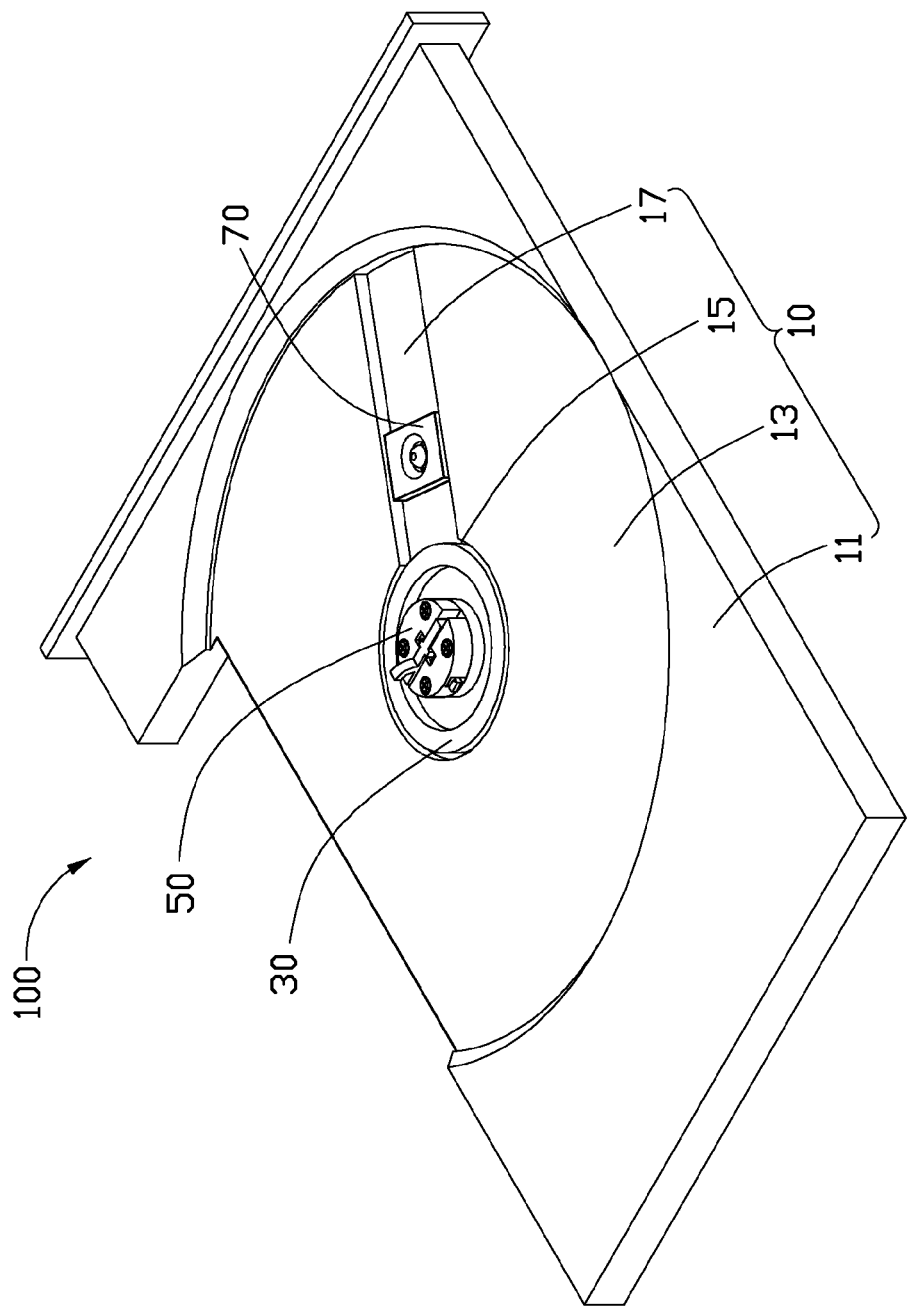
FIG. 1 is an assembled isometric view of an optical disc drive employing an optical disc fixing device, in accordance with an embodiment.
Figure 2:
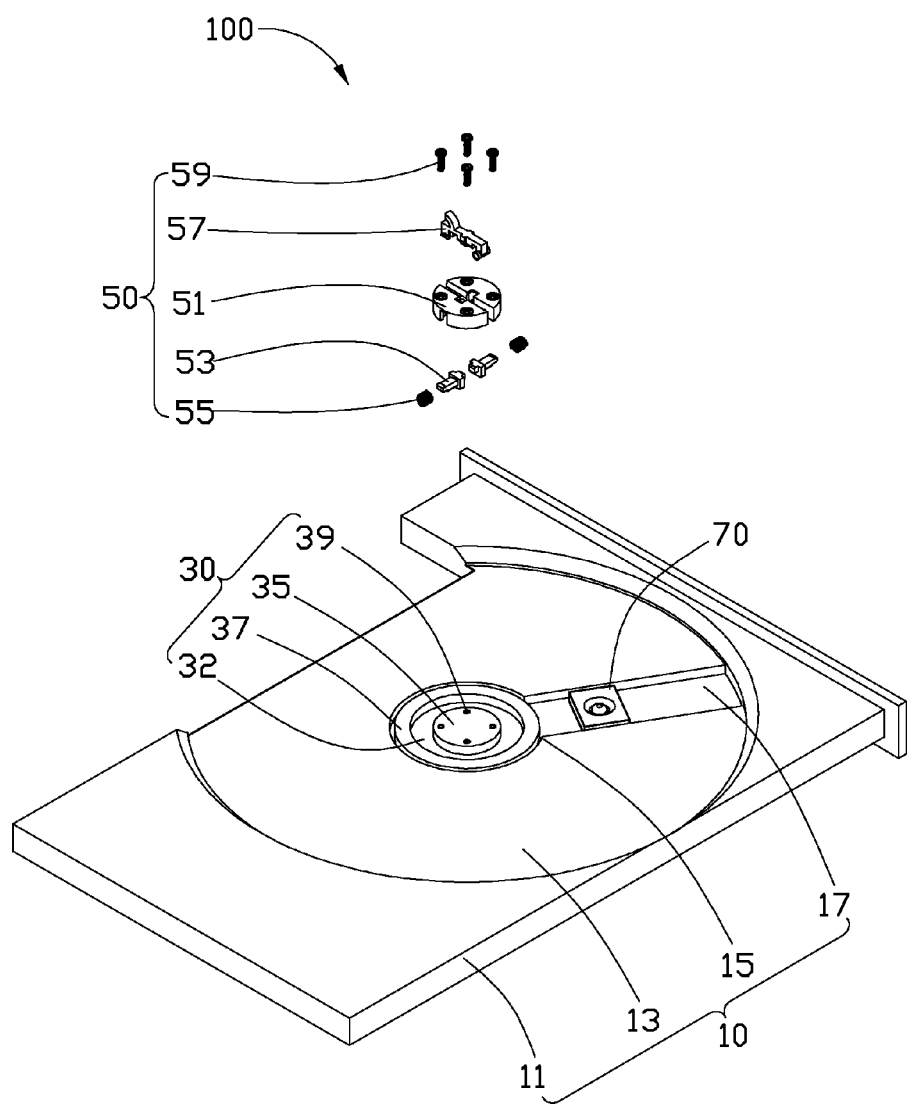
FIG. 2 is an exploded, isometric view of the optical disc drive shown in FIG. 1.

Referring to FIGS. 1 and 2, an optical disc drive 100 includes an optical disc tray 10, a turntable 30, an optical disc fixing device 50 and an optical pickup 70. The optical disc tray 10 is retractably assembled to a main frame (not shown) of an electronic device for bearing optical discs 90 (shown in FIG. 5) of different diameters. The optical disc 90 defines a circular mounting hole 95 (shown in FIG. 6) through the central portion thereof. The optical disc tray 10 is configured to be loaded by a predetermined loading motor (not shown) to be received in and eject from the main frame. In the embodiment, the optical disc tray 10 includes a baseboard 11, a substantially circular receiving slot 13, a rotary hole 15, and an assembly groove 17. The baseboard 11 is substantially rectangular and has an upper surface 111. The circular receiving slot 13 is defined in the middle portion of the upper surface 111 of the baseboard 11 and configured for receiving the optical disc 90 therein. The rotary hole 15 is defined through the center of the bottom of the receiving slot 13 and is configured for assembling the turntable 30 therein. The assembly groove 17 is recessed in the bottom of the receiving slot 13 along a radial axis of the circular receiving slot 13. One end of the assembly groove 17 communicates with the rotary hole 15, and the other end of the assembly groove 17 extends along a radial axis to the periphery of the receiving slot 13.

The turntable 30 is rotatably assembled within the rotary hole 15 to support the aforementioned optical disc 90. The turntable 30 can be driven by a rotary motor (not shown) which rotates with respect to the main frame. In the embodiment, the turntable 30 is substantially cylindrical and includes an annular mounting groove 32 recessed in an upper cross section of the turntable 30 toward the receiving slot 13 side, thereby forming a support post 35 located at the center of the upper cross section of the turntable 30 and a circular peripheral sidewall 37 surrounding the mounting groove 32. The upper cross section of the support post 35 defines a plurality of fixing holes 39 adjacent to the periphery thereof. In the illustrated embodiment, there are four fixing holes 39.

Figure 3:
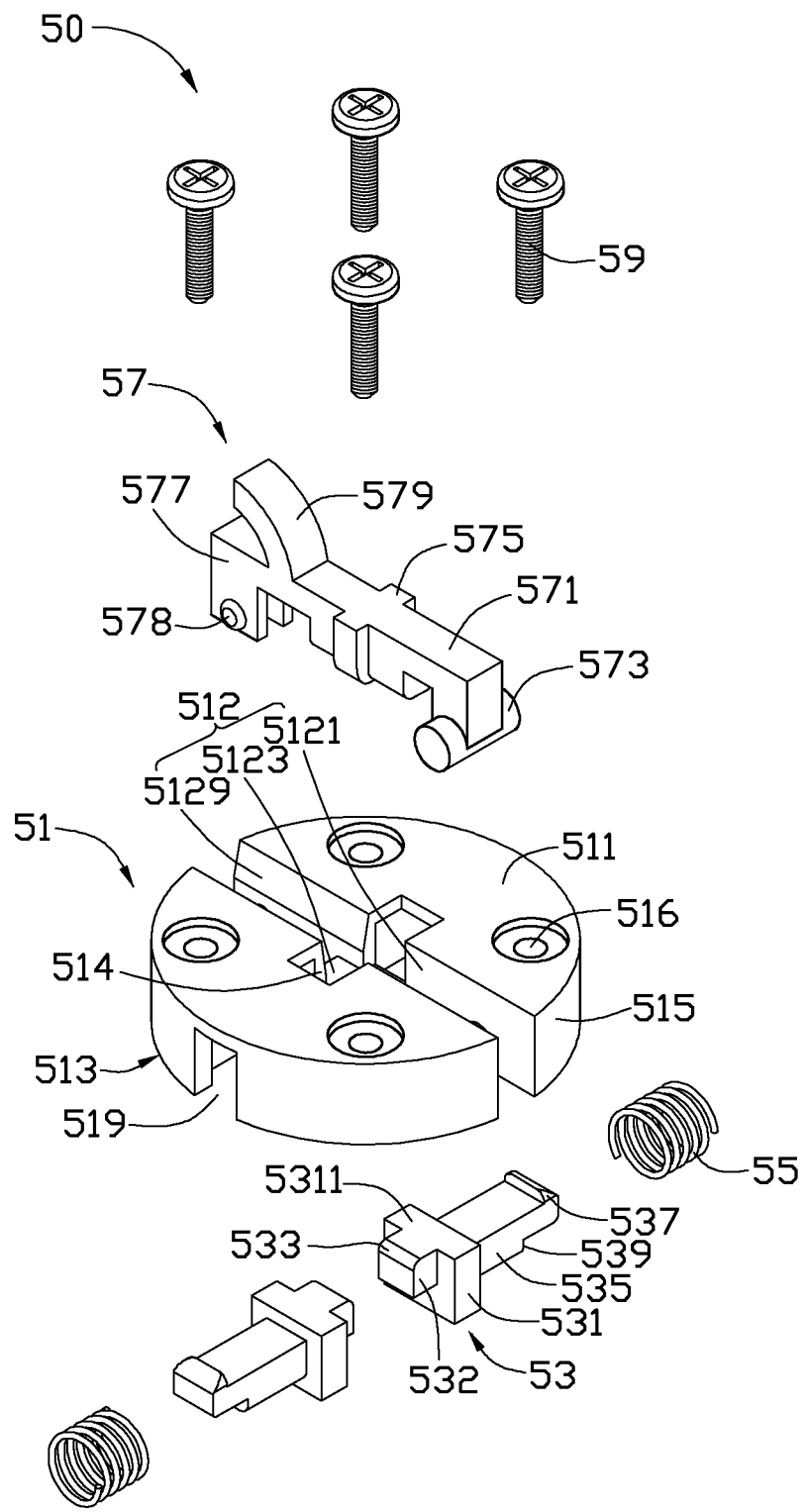
FIG. 3 is an exploded isometric view of the optical disc fixing device in FIG. 1, in accordance with an embodiment.
Figure 4:
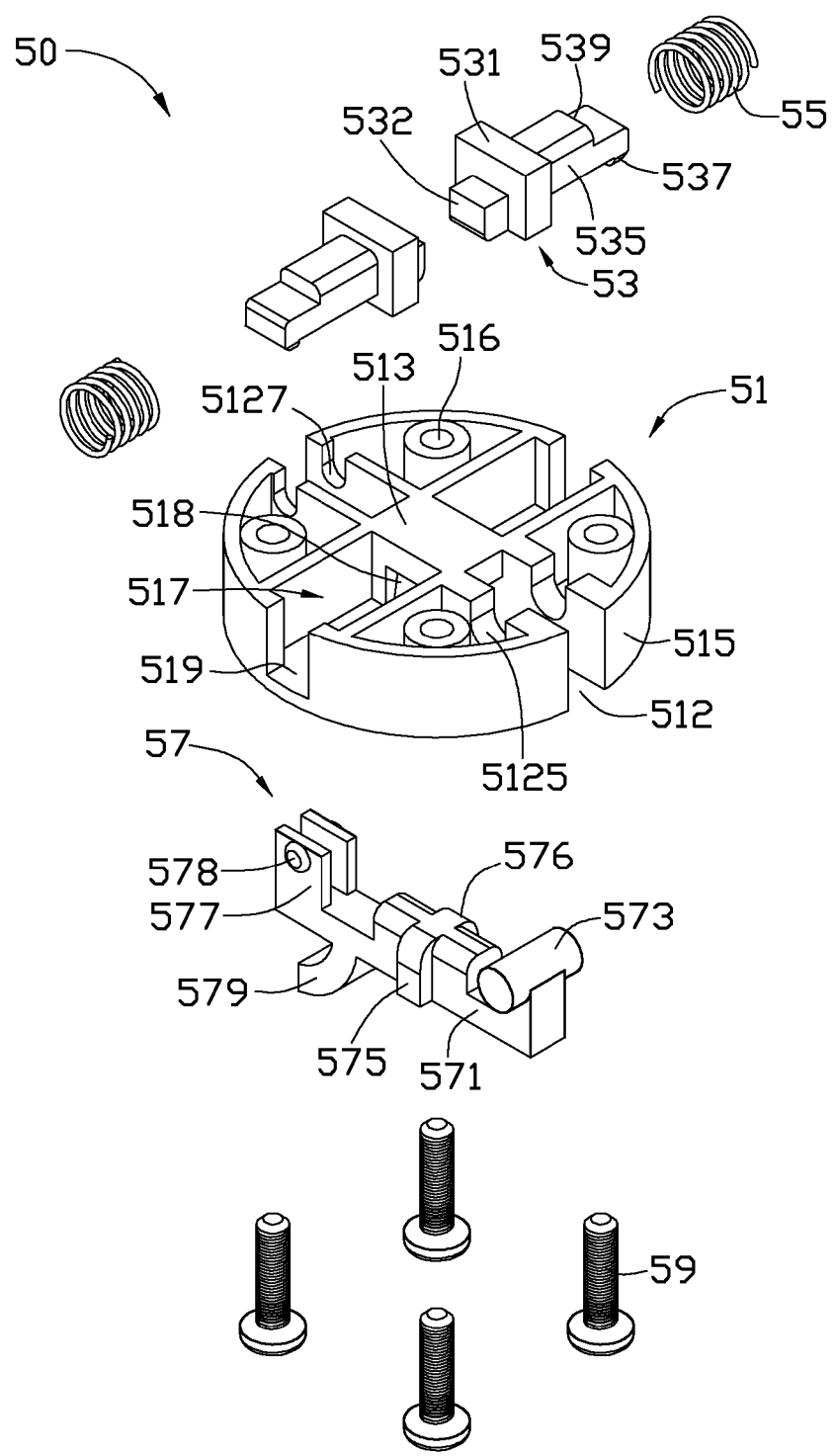
FIG. 4 is similar to FIG. 3, but viewed from another aspect.

Also referring to FIGS. 3 and 4, the optical disc fixing device 50 is assembled to the turntable 30 and configured for fixing the optical disc 90, as the optical disc tray 10 moves into or out of the main frame of the electronic device. The optical disc fixing device 50 includes a clamping chassis 51, at least one latching piece 53, at least one elastic member 55, and a control member 57. The clamping chassis 51 is fixed on the turntable 30 and configured to be loaded to rotate relative to the optical disc tray 10 during use. The at least one latching piece 53 together with the at least one elastic member 55 is releasable within the clamping chassis 51 and controlled by the control member 57 to separate from the clamping chassis 51 to hold the optical disc 90. In the illustrated embodiment, the optical disc fixing device 50 includes a clamping chassis 51, two latching pieces 53, two elastic members 55, a control member 57 and a plurality of fasteners 59, four fasteners 59 in the illustrated embodiment.

The clamping chassis 51 is substantially disc-shaped, and substantially the same shape as the support post 35 and the mounting hole 95 of the optical disc 90. The clamping chassis 51 is fixed on the support post 35 of the turntable 30 and includes a top surface 511, an opposite bottom surface 513, and a peripheral wall 515. The top surface 511 defines a mounting groove 512 therein along a radial axis of the top surface 511, such that the clamping chassis 51 is divided into two parts by the mounting groove 512. Two ends of the mounting groove 512 are defined through to communicate with the bottom surface 513 and the peripheral wall 515. The mounting groove 512 includes two substantially parallel lateral walls 5121 and a bottom wall 5123 located at the central portion of the clamping chassis 51. One end of the mounting groove 512 defines two hinged holes 5125 in the corresponding lateral walls 5121 opposite to each other and positioned adjacent to the bottom surface 513 side. The other end of the mounting groove 512 defines two latching slots 5127 in the opposite lateral walls 5121 adjacent to the peripheral wall 515 and the bottom surface 513 side. Two resisting slopes 5129 are formed at the lateral walls 5121 opposite to the corresponding two latching slots 5127 and located adjacent to the top surface 511. The top surface 511 further defines a mounting slot 514 in the central portion thereof substantially perpendicular to the mounting groove 512 and four assembly holes 516 therethrough adjacent to the periphery of the clamping chassis 51 corresponding to the four fixing holes 39 of the turntable 30. The mounting slot 514 crosses the aforementioned mounting groove 512 at right angles.

The bottom surface 513 includes two accommodating slots 517 defined therein and located at two sides of the mounting groove 512. The two accommodating slots 517 are configured for assembling the two latching pieces 53 therein. One end of each accommodating slot 517 communicates with a corresponding distal end of the mounting slot 514, thereby forming a cutout 518 through one corresponding lateral wall 5121 of the mounting groove 512 and the opposite end of each accommodating slot 517 communicates with the peripheral wall 515, thereby forming an opening 519 through the peripheral wall 515.

The two latching pieces 53 together with the two elastic members 55 are respectively assembled within the corresponding two accommodating slots 517 of the clamping chassis 51. Each latching piece 53 includes a main body 531, a resisting block 532 and a latching block 535. The main body 531 has a sidewall 5311. The resisting block 532 protrudes from one end of the main body 531 and is positioned adjacent to the sidewall 5311 side. The resisting block 532 is substantially the same shape as the cutout 518 and forms a substantially curved first resisting surface 533 at the distal end of the resisting block 532 toward the sidewall 5311. The latching block 535 protrudes from the other end of the main body 531 opposite to the resisting block 532. A latching hook 537 and a stepped supporting portion 539 are formed at the distal end of the latching block 535 back to back. The latching hook 537 is positioned toward the sidewall 5311 of the main body 531, the supporting portion 539 is formed at the other opposite side of the latching block 532 and configured for supporting and abutting the optical disc 90 on the clamping chassis 51. The two elastic members 55 are two coil springs wound around the corresponding two latching pieces 53.

The control member 57 is releasably assembled to the mounting groove 512 of the clamping chassis 51 for optionally releasing the two latching pieces 53 to take down the optical disc 90 or directing the two latching pieces 53 to clamp the optical disc 90. In the embodiment, the control member 57 is hinged on the clamping chassis 51. The control member 57 includes a base body 571, a hinge shaft 573, a resisting protrusion 575, a latching portion 577, and an operating arm 579. The base body 571 is substantially bar shaped with substantially the same shape as that of the mounting groove 512 of the clamping chassis 51, such that the base body 571 is received within the mounting groove 512. The hinge shaft 573 is formed at one distal end of the base body 571 with an axial direction of the hinge shaft 573 substantially perpendicular to the base body 571. Two ends of the hinge shaft 573 are configured for being hinged with the corresponding two hinged holes 5125 of the clamping chassis 51.

The resisting protrusion 575 has a substantially U-shaped cross section. The resisting protrusion 575 is formed on a peripheral wall of a middle portion of the base body 571 and partially surrounds the base body 571. The resisting protrusion 575 defines two arc-shaped second resisting surfaces 576 adjacent to two opposite corners thereof corresponding to the two first resisting surfaces 533 respectively and located at two opposite sides of the base body 571. The latching portion 577 is disposed at the other end of the base body 571 opposite to the hinge shaft 573 and includes two latching protrusions 578 protruding from two opposite sides of the latching portion 577 corresponding to the two latching slots 5127 of the clamping chassis 51. The operating arm 579 is substantially arc-shaped, protruding from the base body 571, and positioned adjacent to the latching portion 577 end and away from the latching portion 577 side.

The optical pickup 70 is assembled within the assembly groove 17 adjacent to the turntable 30 and configured for recording information on the optical disc 90 or reproducing information therefrom, while moving across the optical disc 90 placed on the optical disc tray 10.

Figure 6:
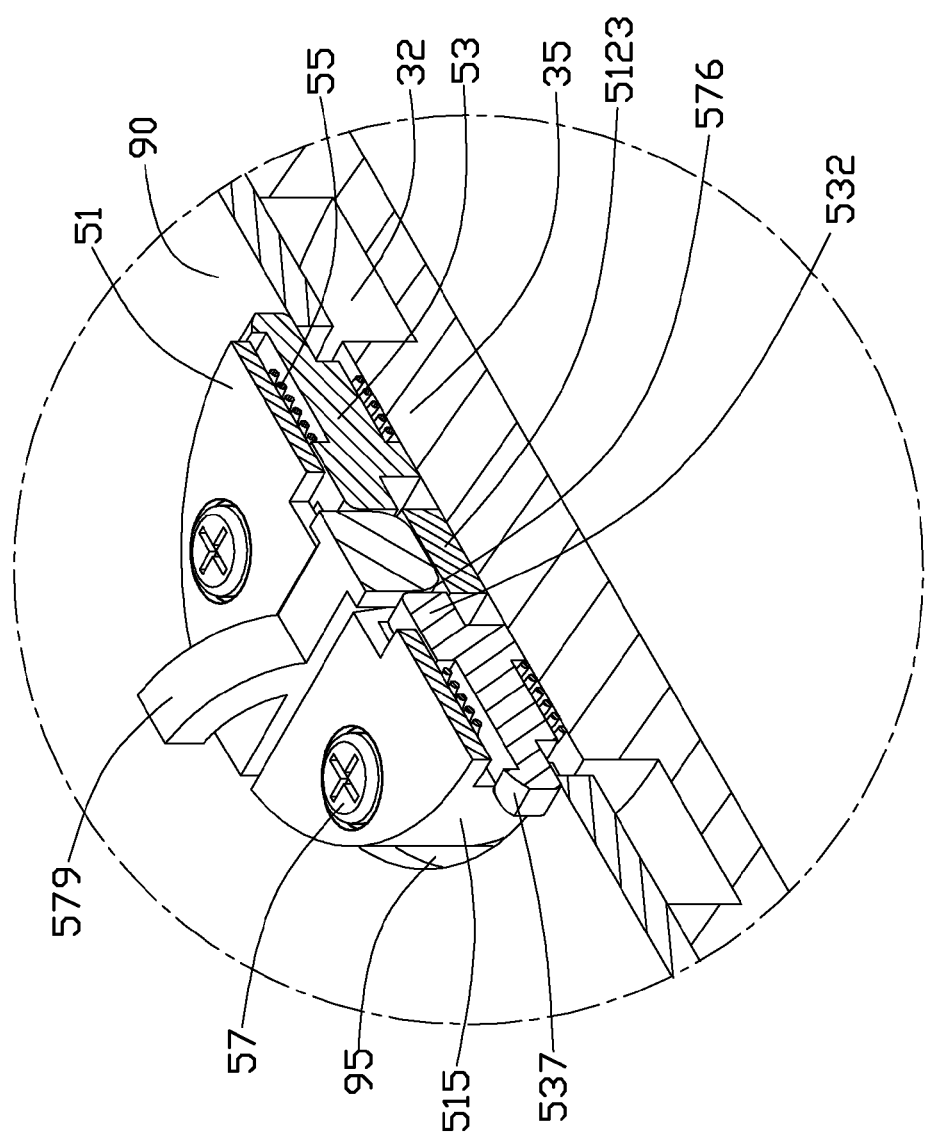
FIG. 6 is an enlarged sectional view of VI shown in FIG. 5.

In assembly, referring to FIGS. 3, 4, and 6, the two elastic members 55 are respectively coiled around the corresponding latching block 535 of the two latching pieces 53. The two latching pieces 53 are assembled into the corresponding two accommodating slots 517 of the clamping chassis 51. One end of the elastic member 55 abuts against the main body 531, and the other end of the elastic member 55 biases the inner peripheral wall 515 adjacent to the opening 519. The resisting block 532 of each latching piece 53 is inserted into the corresponding cutout 518 and partially received within one distal end of the mounting slot 514. The opposite latching hook 537 is received within the corresponding opening 519 of the accommodating slot 517.

The control member 57 is releasably and rotatably assembled to the clamping chassis 51. The two ends of the hinge shaft 573 are respectively hinged into the two corresponding hinged holes 5125. The operating arm 579 is pressed downwardly toward the mounting groove 512 until the base body 571 is completely received within the mounting groove 512. Meanwhile, the resisting protrusion 575 is received within the mounting slot 514 and the two opposite sides of the resisting protrusion 575 tightly resist against and push the corresponding two resisting blocks 532 of the two latching pieces 53 back, such that the two latching hooks 537 are extended from the corresponding two openings 519 of the peripheral wall 515. The latching portion 577 of the control member 57 is correspondingly inserted into the other end of the mounting groove 512, with the two latching protrusions 578 thereof respectively latching into the corresponding two latching slots 5127 of the clamping chassis 51.

Referring to FIGS. 1 and 2 again, the turntable 30 is rotatably assembled in the rotary hole 15 of the optical disc tray 10 for supporting the aforementioned optical disc 90. The assembled optical disc fixing device 50 is then fixed on the support post 35 of the turntable 30 by means of the four fasteners 59. The four fasteners 59 pass through the corresponding four assembly holes 516 and are received in the corresponding four fixing holes 39 of the support post 35. The optical pickup 70 is assembled within the assembly groove 17 of the optical disc tray 10 and positioned adjacent to the turntable 30 to complete the assembly of the optical disc drive 100.

Figure 5:
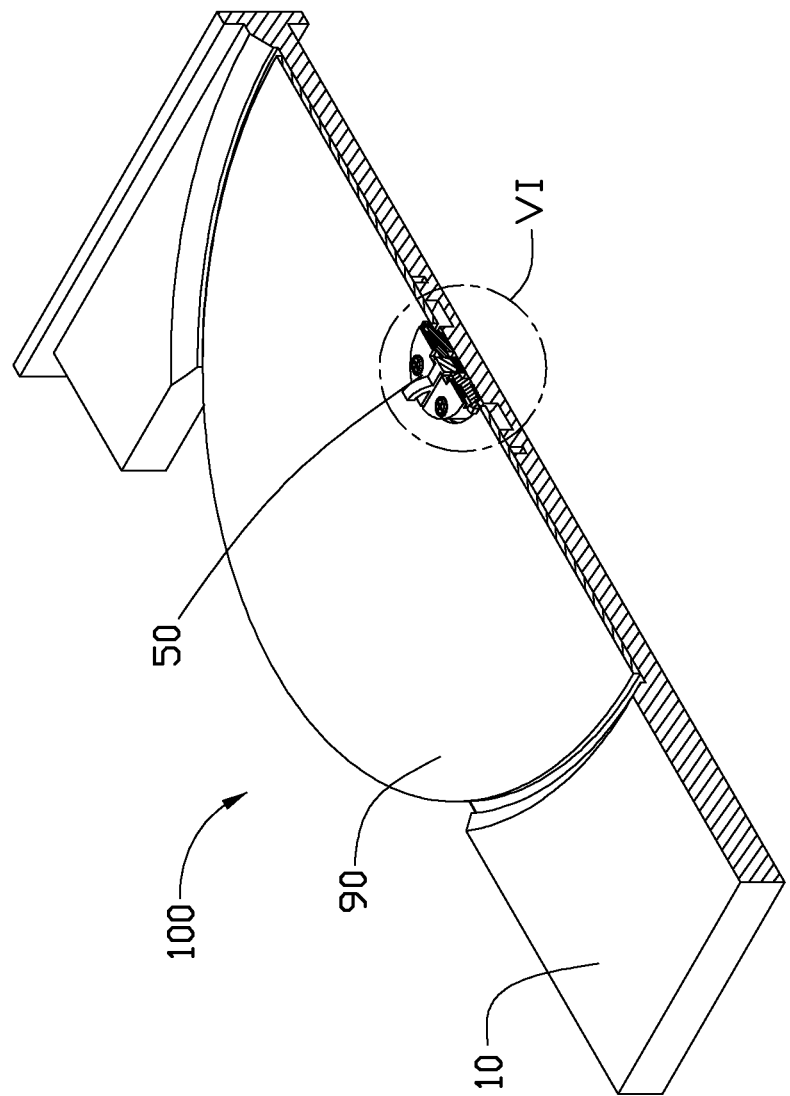
FIG. 5 is a cross-section of the assembled optical disc drive with an optical disc placed thereon.

Referring to FIGS. 5 and 6, to place the optical disc 90 on the optical disc drive 100, the operating arm 579 end of the control member 57 elevates to depart from the clamping chassis 51 and rotate relative to the clamping chassis 51. The two latching protrusions 578 detach. The resisting protrusion 575 disengages from the two latching pieces 53. Correspondingly, the two latching pieces 53 are released and automatically resume in the corresponding two accommodating slots 517 of the clamping chassis 51. The two latching hooks 537 are correspondingly received within the two openings 519 of the clamping chassis 51. At this time, the optical disc 90 is placed on the optical disc fixing device 50 and received within the receiving slot 13 of the optical disc tray 10. The bottom surface of the optical disc 90 is positioned for the optical pickup 70.

The clamping chassis 51 passes through the central mounting hole 95 (shown in FIG. 6) of the optical disc 90 and is extended to the outside. The control member 57 is rotated toward the clamping chassis 51 and presses the operating arm 579 downwardly such that the base body 571 is received in the mounting groove 512. Meanwhile, the resisting protrusion 575 reverse biases the corresponding resisting blocks 532 of the two latching pieces 53, and the two latching hooks 537 are extended from the two openings 519 of the peripheral wall 515 and located upon the optical disc 90. The supporting portion 539 of each latching piece 53 correspondingly biases the inner wall of the central mounting hole 95 of the optical disc 90, such that the optical disc 90 is fixed to the clamping chassis 51. When detaching the optical disc 90 from the optical disc fixing device 50, the steps disclosed need only be followed.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and arrangement of sections within the principles of the disclosure to the full extent indicated by the broad general meaning of the terms, in which the appended claims are expressed.

What is claimed is:

1. An optical disc fixing device for an optical disc, the optical disc defining a circular mounting hole at the center thereof, the optical disc fixing device comprising:
   a cylindrical clamping chassis having a shape substantially the same as that of the mounting hole of the optical disc and comprising a peripheral sidewall, the clamping chassis comprising a top surface defining a mounting groove, an end of the mounting groove defining two latching slots;
   at least one latching piece assembled within the clamping chassis;
   at least one elastic member assembled to the at least one latching piece to provide an elastic force to the at least one latching piece; and
   a control member releasably assembled to the clamping chassis for partially extending the at least one latching piece from the peripheral sidewall of the clamping chassis to hold the optical disc, the control member comprising a base body and a latching portion formed at a proximal end of the base body, and the latching portion comprising two latching protrusions protruding from two opposite sides corresponding to the two latching slots of the clamping chassis.

2. The optical disc fixing device as claimed in claim 1, wherein the clamping chassis further comprises a bottom surface opposite to the top surface, wherein the bottom surface defines at least one accommodating slot with two ends respectively communicating with the mounting groove and the peripheral wall, the at least one latching piece together with the at least one elastic member is assembled within the at least one accommodating slot, and the control member is assembled to the mounting groove and optionally biases one end of the at least latching piece.

3. The optical disc fixing device as claimed in claim 2, wherein the mounting groove is positioned along a radial axis of the top surface of the clamping chassis, a first and a second ends of the mounting groove are defined through to communicate with the bottom surface and the peripheral wall, and the control member hinges on the other end of the mounting groove away from the latching slots to be receivable within the mounting groove.

4. The optical disc fixing device as claimed in claim 3, wherein the other end of the mounting groove defines two hinged holes in two substantially parallel lateral walls of the mounting groove opposite to each other; the control member further comprises a hinge shaft disposed at a distal end of the base body, wherein two ends of the hinge shaft are respectively received in the corresponding two hinged holes of the clamping chassis.

5. The optical disc fixing device as claimed in claim 4, wherein the top surface further defines a mounting slot crossing with the mounting groove and communicating with the at least one accommodating slot; the control member further comprises a resisting protrusion formed on the base body resisting the latching piece toward the peripheral sidewall.

6. The optical disc fixing device as claimed in claim 4, wherein the control member further comprises an operating arm protruding from the base body adjacent to the latching portion away from the latching portion.

7. An optical disc fixing device to fix an optical disc, the optical disc defining a circular mounting hole at the center portion, the optical disc fixing device comprising:
   a cylindrical clamping chassis having a shape substantially the same as the mounting hole of the optical disc and comprising a peripheral sidewall;
   two latching pieces assembled within the clamping chassis and located adjacent to the peripheral sidewall of the clamping chassis;
   a control member hinged on the clamping chassis enabling the two latching pieces to partially extend from the peripheral sidewall of the clamping chassis to hold the optical disc; and two elastic members assembled to the corresponding latching pieces to provide an elastic force to enable the two latching pieces to resume their original position when the control member is released.

8. The optical disc fixing device as claimed in claim 7, wherein the clamping chassis comprises a top surface and a bottom surface opposite to the top surface, wherein the top surface defines a mounting groove dividing the clamping chassis into two parts; the bottom surface defines two accommodating slots positioned at two sides of the mounting groove, each communicating with the mounting groove; the two latching pieces together with the two elastic members are assembled within the two accommodating slots; the control member hinges on the mounting groove for biasing the two latching pieces.

9. The optical disc fixing device as claimed in claim 8, wherein the top surface further defines a mounting slot crossing with the mounting groove and located between the two accommodating slots, two ends of the mounting slot respectively communicating with the two accommodating slots; the control member comprises a base body and a resisting protrusion formed on the base body toward the peripheral sidewall.

10. The optical disc fixing device as claimed in claim 9, wherein the distal end of the mounting groove defines two latching slots, and the control member further comprises a latching portion formed at a distal end of the base body opposite to the hinged end for latching with the two latching slots of the clamping chassis.

11. The optical disc fixing device as claimed in claim 9, wherein the peripheral sidewall defines two openings respectively communicating with the two corresponding accommodating slots, each latching piece comprising a main body, a resisting block, and a latching block, the resisting block and the latching block respectively formed at two ends of the main body, the resisting block biasing the resisting protrusion of the control member, and the latching block being received in the accommodating slot and partially extending from the opening of the clamping chassis.

12. The optical disc fixing device as claimed in claim 11, wherein the latching piece further comprises a latching hook and a stepped shaped supporting portion formed at the distal end of the latching block back to back.

13. An optical disc drive, comprising:
   an optical disc tray for bearing an optical disc comprising a central mounting hole;

a turntable rotatably assembled to the optical disc carry tray for supporting the optical disc;

an optical pickup assembled to the bearing tray and positioned adjacent to the turntable for recording or reproducing information on the optical disc; and an optical disc fixing device to fix the optical disc, the optical disc fixing device comprising:

a cylindrical clamping chassis fixed on the turntable and having a shape substantially the same as the mounting hole of the optical disc, the clamping chassis comprising a top surface and an opposite bottom surface, the top surface defining a mounting groove and a mounting slot, the bottom surface defining two accommodating slots positioned adjacent to two sides of the mounting groove and communicating with the mounting groove, the mounting slot crossing with the mounting groove and located between the two accommodating slots, two ends of the mounting slot respectively communicate with the two accommodating slots, a distal end of the mounting groove defining two latching slots;

two latching pieces assembled within the clamping chassis and located adjacent to the peripheral sidewall of the clamping chassis;

a control member hinged on the clamping chassis enabling the two latching pieces to partially extend from the peripheral sidewall of the clamping chassis for holding the optical disc, the control member hinging on the mounting groove for biasing the two latching pieces, the control member comprising a base body, a resisting protrusion formed on the base body, and a latching portion formed at a distal end of the base body opposite to the hinged end, the base body hinged to one end of the mounting groove, and the resisting protrusion clamped between the two latching pieces to resist two corresponding latching pieces toward the peripheral sidewall, the latching portion latching with the two latching slots of the clamping chassis; and two elastic members respectively assembled to the two latching pieces providing an elastic force to enable the two latching pieces to return to original positions when the control member is released, wherein the two latching pieces together with the two elastic members are assembled within the two accommodating slots.

14. The optical disc drive as claimed in claim 13, wherein the optical disc tray comprises a baseboard defining a rotary hole, an assembly groove, and a circular receiving slot for receiving the optical disc; the rotary hole is defined through the center of the receiving slot, and the assembly groove is recessed in a bottom of the receiving slot along a radial axis of the circular receiving slot; the turntable is rotatably received within the rotary hole, and the optical pickup is assembled within the assembly groove.

15. The optical disc drive as claimed in claim 13, wherein the peripheral sidewall defines two openings respectively communicating with the two corresponding accommodating slots, each latching piece comprises a main body, a resisting block and a latching block, respectively formed at two ends of the main body, the resisting block biases the resisting protrusion of the control member, and the latching block is received within the accommodating slot and partially extended from the opening of the clamping chassis.

* * * * *